March 13, 1934.     J. W. LUKE     1,950,804
STORAGE BATTERY TERMINAL CONNECTION
Filed June 14, 1929
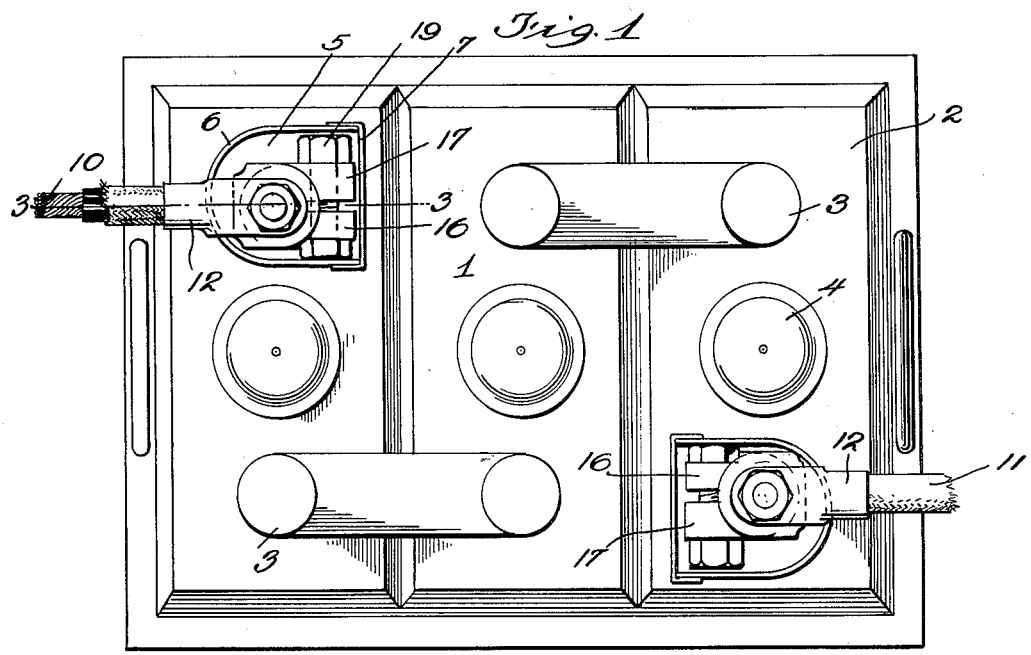
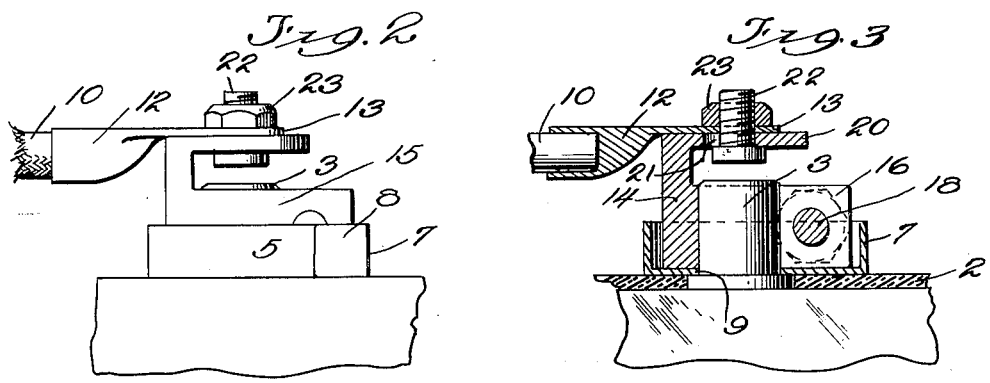
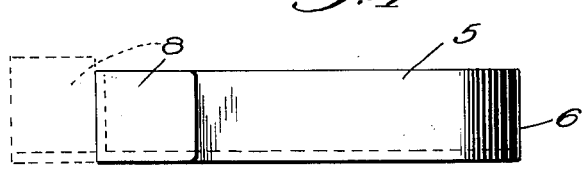
INVENTOR.
John W. Luke
BY Elmer Stewart
ATTORNEY.

Patented Mar. 13, 1934

1,950,804

UNITED STATES PATENT OFFICE 1,950,804

STORAGE BATTERY TERMINAL CONNECTION

John W. Luke, St. Augustine, Fla.

Application June 14, 1929, Serial No. 370,889

2 Claims. (Cl. 173—259)

This invention relates to an improved storage battery terminal connection of the type which is adapted to prevent corrosion of the electric cable and its connecting bolt by the acid from the battery.

An object of my invention is to carry out the above purpose by means of an improved grease retainer or lubricant container to be mounted fixedly upon the electrode post of the storage battery.

A further object of the invention is to give this container such form as will admit of ready manipulation of the terminal connection or if necessary the removal of one wall of the container to permit the more convenient use of the pliers or other tools needed in manipulating the terminal connection.

Among the objects of my invention is the further one of providing a bolt or stud on the terminal connection for the cable terminal but which cannot be removed without separating the connection from the battery post.

Further advantages and objects of the invention will appear from the following description of the preferred form of my invention as illustrated in the accompanying drawing in which:

Fig. 1 is a plan view of a storage battery including my improved terminal connection;

Fig. 2 is a side elevation of the terminal connection itself;

Fig. 3 is a vertical section on the line 3—3 of Fig. 1, and

Fig. 4 is an enlarged side elevation of the lubricant container alone.

In the drawing I have shown the conventional three cell storage battery 1 and its customary case. Each of the cells is covered by a plate 2 or equivalent means such as plastic composition. Each cell is illustrated as having the terminal posts 3, 3, projecting vertically through the cover 2. These posts are of the usual type, being substantially cylindrical with a slight taper. Filling caps 4, 4 are also shown in each cover plate.

The grease retainer or lubricant container is shown in the form of a cup 5 having a side wall in the nature of a curved flange 6. This flange as will be apparent in Figs. 2 and 3 projects vertically for slightly more than one half of the height of the post 3 above cover plate 2. The flange 6 is illustrated as being curved into a U-shape and having an end 7 which forms a continuation of the bottom of the cup in its initial form.

The end 7 has lateral projections in the nature of flaps 8, 8. In Fig. 4 the flaps 8 and end 7 are shown in dotted lines in the initial position and in full lines when the end 7 has been brought up into vertical position with the flaps 8, 8 in contact with the outer surfaces of the flange 6. In this way the end 7 and the flange 6 form a substantially liquid tight cup.

The bottom of the container has a hole 9, somewhat off the center as will be apparent in Fig. 1 in order to accommodate the different proportions of the attaching bolt for the terminal connection. This hole 9 is slightly less than the bottom diameter of the tapering post 3 so that the container 5 is forced down upon the post 3 until the container rests against the cover 2 and forms a liquid tight connection with the post.

The electric conductors or cables 10, 11 are shown in Fig. 1 to end in lugs 12 which are soldered to the conductors in the usual manner. Each lug has a flattened end 13 with a bolt hole therethrough.

The terminal connectors 14 consist of cast metal of the usual type which extend considerably above the height of the post 3. The lower part of the connectors 14 include a split collar 15 having ears 16 and 17 each of which have alined openings. The usual bolt 18 is passed through the alined opening and fastened with a nut 19 so that the split collar is compressed or clamped over the side walls of the battery post.

The upper portion of the connector 14 is extended laterally over the top of post 3 to form the extension 20. This extension is parallel with the split collar 15 and slightly spaced from the post 3. A hole 21 is formed in the lug 20.

The cable terminal is attached to the lug 20 through the flattened end 13 which is received over the upper end of a bolt 22. The bolt has its head in the space between the extension 20 and the top of the post 3 and is normally prevented from rotation in the hole in the extension 20. The nut 23 is drawn tight to connect the member 13 with the lug 20.

In assembling this device the container 5 is driven down over the post 3 to form a liquid tight joint. The bolt 22 must be inserted through the extension lug 20 before the latter is placed over the post 3. With the bolt 22 in place the connection 14 is slipped over the post 3.

The nut 19 may now be drawn up to clamp the split collar. During this operation the end wall 7 may be horizontal. With the connector 14 tightly clamped on the post 3 the end wall 7 may be brought into vertical position and the cup thus formed may be filled with grease or oil.

The end 13 may now be attached to the bolt 22.

There is thus formed a tight connection over extended conducting surfaces, between the connector 14 and the post 3 and the grease or oil contained in the cup 5 will prevent the creeping of the battery acid. In this way no corrosion can be directly caused either on the connector 14 or the cable terminal 10. In addition the vertical spacing of the connecting means 20 serves to raise the connection between the cable 10 and the post 3 above the area of danger of corrosion. It will of course be apparent that the manner of assembling the bolt 22 on the extension 20 serves to insure the bolt against loss or accidental removal.

The above description and the drawing illustrate the preferred form of the invention but it is understood that this does not limit the scope of the invention other than as may appear from the following claims.

What I claim is:

1. In combination, with the post of a battery electrode, a connector comprising a split collar having parallel apertured ears, a bolt in said ears for clamping the connector on said post, a lubricant container cup having a bottom fitting around said post and permanent vertical side walls around the collar and apertured ears, and an end wall pivoted at its lower edge to the bottom of the container cup across the ends of said connector ears for engagement with the free ends of the said side walls.

2. In combination with the post of a battery electrode, a lubricant container having a bottom with a hole eccentric thereof for fitting around the said post, a curvilinear side wall on the container, one end of said side wall being spaced from the post a greater distance than the other end to give access to the post, an end wall integral with the bottom, a flap on each side of the end wall, said flaps overlapping and retaining the ends of said side wall.

JOHN W. LUKE.